United States Patent
Coutant et al.

[11] Patent Number: 5,990,437
[45] Date of Patent: Nov. 23, 1999

[54] SYSTEM FOR SORTING ARTICLES

[75] Inventors: Ralph Coutant, Ridgewood; Alfred W. Iversen, Upper Montclair; Frank P. Steblaj, Mountain Lakes, all of N.J.

[73] Assignee: W & H Systems, Inc., Carlstadt, N.J.

[21] Appl. No.: 08/794,861

[22] Filed: Feb. 5, 1997

[51] Int. Cl.[6] .............................. B07C 5/00; B65G 47/40
[52] U.S. Cl. ..................... 209/583; 209/3.3; 198/370.04; 198/704; 198/349.95
[58] Field of Search ................ 198/370.04, 370.03, 198/704, 349.95; 209/3.3, 583, 579, 577, 584, 587, 559

[56] References Cited

U.S. PATENT DOCUMENTS

| Patent No. | Date | Inventor | Ref |
|---|---|---|---|
| 772,569 | 10/1904 | Kling | 198/704 |
| 3,167,192 | 1/1965 | Harrison et al. . | |
| 3,265,190 | 8/1966 | Boehm . | |
| 3,269,520 | 8/1966 | Bishop et al. . | |
| 3,318,435 | 5/1967 | Scott . | |
| 3,360,106 | 12/1967 | Harrison et al. . | |
| 3,463,298 | 8/1969 | Harrison . | |
| 3,630,394 | 12/1971 | Kingzett et al. . | |
| 3,674,140 | 7/1972 | FIle | 209/559 |
| 3,759,381 | 9/1973 | Mercadie et al. | 209/559 |
| 3,848,728 | 11/1974 | Leibrick et al. . | |
| 3,888,351 | 6/1975 | Wilson | 209/577 |
| 3,945,485 | 3/1976 | Speaker . | |
| 3,977,513 | 8/1976 | Rushforth | 198/370.04 |
| 4,031,998 | 6/1977 | Suzuki et al. | 198/370.04 |
| 4,139,088 | 2/1979 | Olsen . | |
| 4,174,773 | 11/1979 | Venzke . | |
| 4,461,378 | 7/1984 | Roth | 198/370.04 |
| 4,635,785 | 1/1987 | Prydtz . | |
| 4,832,204 | 5/1989 | Handy et al. | 209/3.3 |
| 5,301,790 | 4/1994 | Prydtz et al. . | |
| 5,325,972 | 7/1994 | Prydtz et al. | 209/583 |
| 5,590,995 | 1/1997 | Berkers et al. | 198/357 |

Primary Examiner—Christopher P. Ellis
Assistant Examiner—Thuy V. Tran
Attorney, Agent, or Firm—Gibbons, Del Deo, Dolan, Griffinger + Vecchione

[57] ABSTRACT

A system for sorting articles, the system having a track which defines a route starting at at least one loading point, the route continuing on to a plurality of destination points and arriving back at the loading point. The system also has at least one tray for conveying an article from the loading point to a selected one of the destination points. The track includes a first segment for momentarily tilting a leading end of the tray upward relative to a trailing end of the tray and possibly downward again, and a second segment for laterally tilting the tray at an angle. The first and second segments selectively maneuver an article loaded in the tray to a bottom corner thereof prior to the tray reaching the selected destination point in order to substantially reduce the jarring of the article during the discharge thereof at the selected destination point. A scanner is provided for scanning an identification-code disposed on the article. The scanner is coupled to a controller which determines the selected destination point using the information obtained by the scanner from the identification-code disposed on the article.

29 Claims, 16 Drawing Sheets

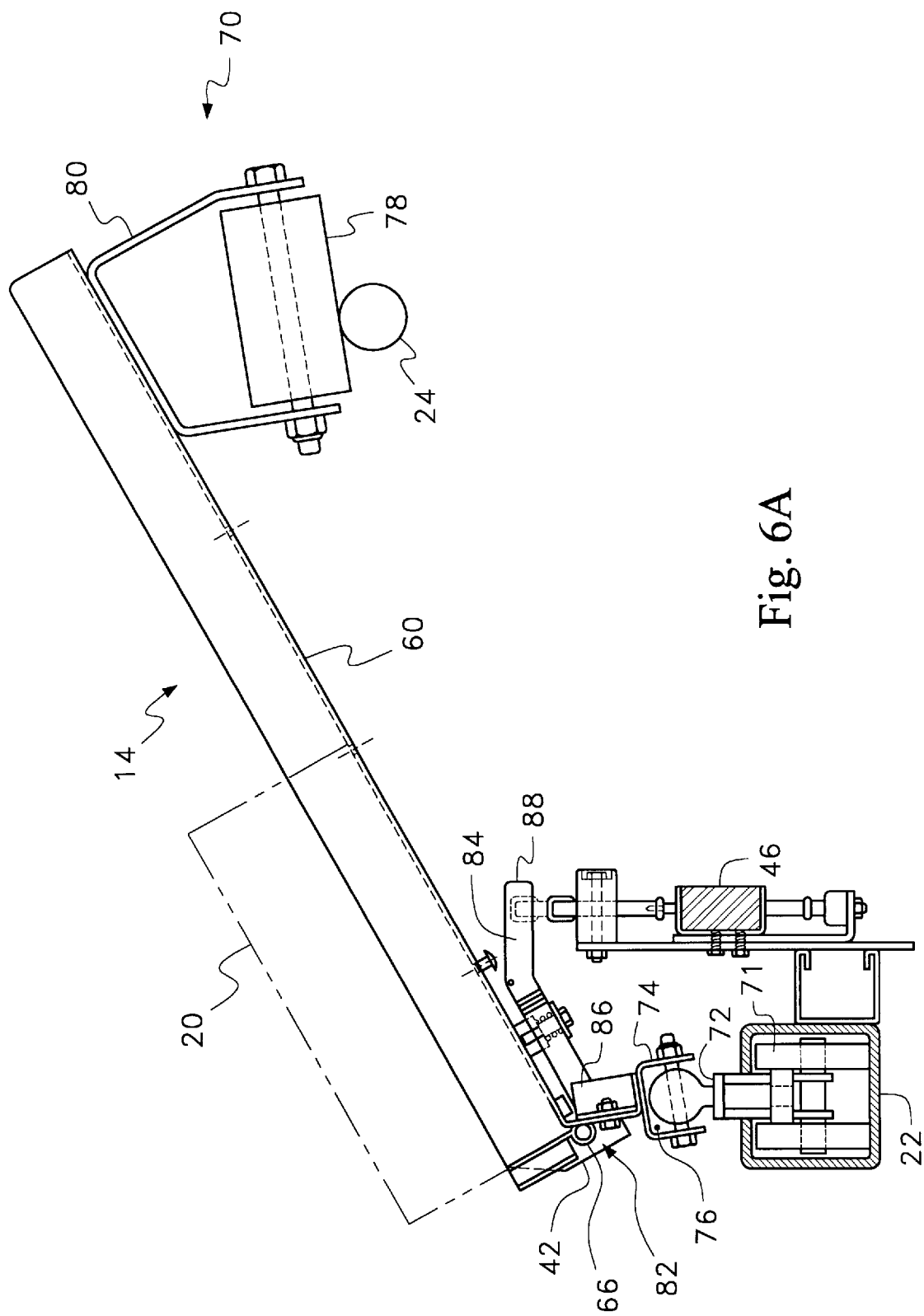

SYSTEM FOR SORTING ARTICLES

FIELD OF THE INVENTION

The present invention relates to sorting and conveying systems. More specifically, the present invention relates to an inexpensive article sortation system which utilizes carrying trays that are tilted from a horizontal position to an angled position prior to the discharge of articles carried by the trays.

BACKGROUND OF THE INVENTION

Various article sortation systems have been employed in the merchandising and processing of articles and parcels. Such systems require rapid and reliable transportation of the articles from a loading station to one of any number of unloading stations or destinations. These systems are commonly used in airport terminals to sort baggage, in post offices to sort mail, and in warehouses to sort delivered articles to selected storage areas in the warehouses. Article sortation systems must be capable of handling a wide variety of articles which are placed on trays for conveying and sorting. Present day article sortation systems operate at speeds which enable them to transport articles adequately. As the speeds of the carrying trays increase to allow for the sorting of greater quantities of articles, difficulties have surfaced in discharging the articles from the carrying trays at the article destination points or sortation lanes. Some of these difficulties involve the articles being thrown or tumbled from the trays during discharging, which can cause damage to the article. Another difficulty involves the accuracy of article discharge which results in articles being improperly sorted and the like.

The prior art has made many attempts to solve these difficulties by providing conveyor systems which unload carried articles by some type of tray tilting operation. For example, U.S. Pat. No. 4,461,378 to Roth discloses a power driven conveyer assembly which has a supporting framework that defines a conveyor pathway. A conveyor belt follows the pathway and has a top surface which is adapted for carrying articles. The belt is then tilted to one side of the pathway to discharge the carried articles. Another example can be seen in U.S. Pat. No. 3,360,106 to Harrison et al. which discloses a continuous conveyor system having a carriage mechanism with individual trays mounted thereon. Each tray is supported on the carriage by a linkage assembly that can tilt the tray in either direction. Many other article sortation systems employing article discharge by tray tilting are described in the prior art.

A major disadvantage of these prior art article sortation systems lies in their mechanical complexity which results in high capital costs and high maintenance costs. Further, the mechanical complexity of prior art sortation systems may result in less than desirable reliability. Moreover, the gentleness and accuracy with which articles are discharged in some prior art sortation systems leaves much to be desired.

Therefore, a need exists for a simpler and less expensive article sortation system which is capable of sorting a wide variety of articles in an accurate and gentle manner.

SUMMARY OF THE INVENTION

In accordance with the present invention, there is provided a system for sorting articles. The system comprises a track which defines a route starting at at least one loading point. The route defined by the track continues on to a plurality of destination points and arrives back at the loading point. The system also comprises at least one tray for conveying an article from the loading point to a selected one of the destination points. The track includes first means for momentarily tilting a leading end of the tray upward relative to a trailing end of the tray and possibly downward again, and second means for laterally tilting the tray at an angle. The first and second means selectively maneuvers an article loaded in the tray to a bottom corner thereof prior to the tray reaching the selected destination point in order to substantially reduce the jarring of the article during the discharge thereof at the selected destination point.

DESCRIPTION OF THE DRAWINGS

A more complete understanding of the present invention may be obtained from consideration of the following description in conjunction with the drawings in which:

FIG. 6A depicts a diverter engaging the latch lever of the carrying tray; and

DETAILED DESCRIPTION OF VARIOUS ILLUSTRATIVE EMBODIMENTS

Figure 1A:
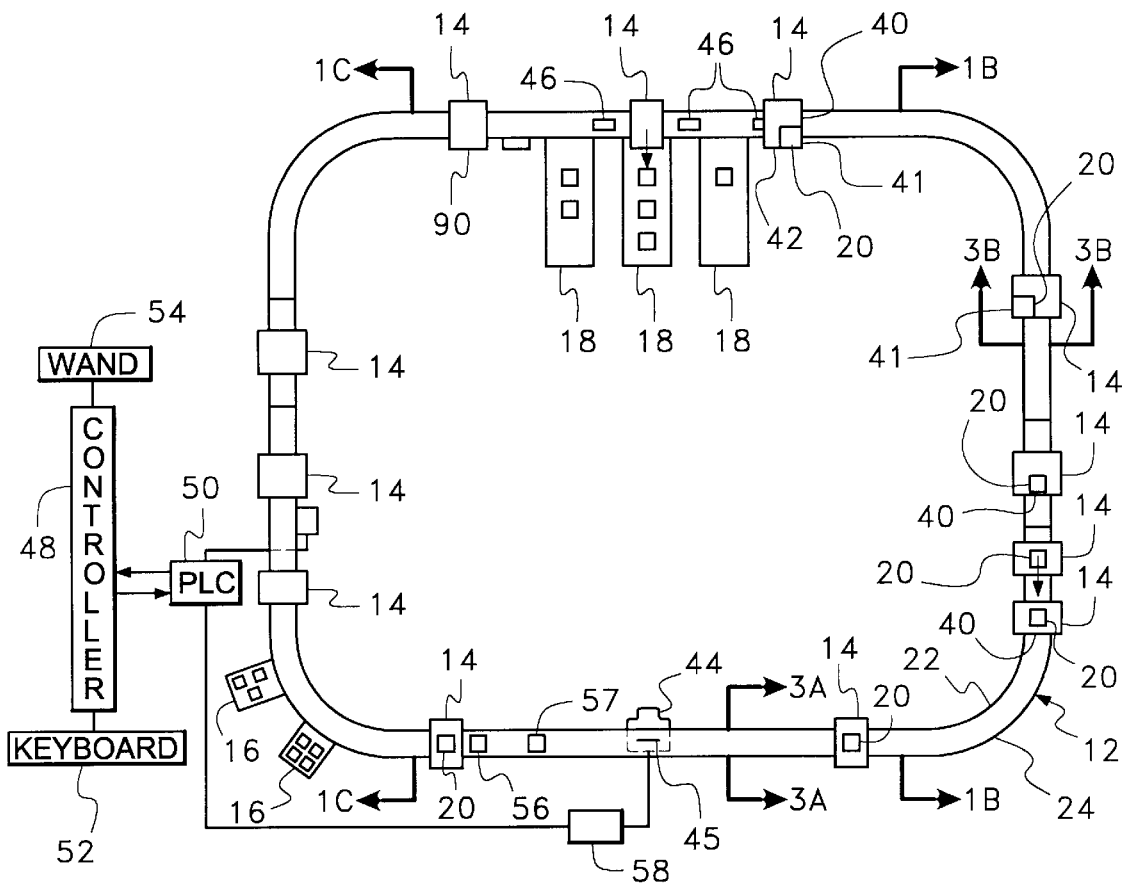
FIG. 1A is a top plan view of an exemplary embodiment of the track assembly of the article sortation system of the present invention.

Referring to FIG. 1A, an embodiment of the article sortation system 10 of the present invention is shown. The sortation system 10 basically consists of a plurality of carrying trays 14 which are continuously transported along a track assembly 12 at a relatively constant speed. The track assembly 12 defines a continuous pathway or route that originates at one or more article loading stations 16, continues on through a plurality of sortation lanes 18 or article destination points, and returns to the article loading stations 16. The loading stations 16 store articles 20 which have been delivered thereto in bulk and need to be sorted. The carrying trays 14 can be loaded from either or both sides of the track assembly 12 and the trays 14 are capable of discharging the articles 20 from one side or the other side of the track assembly 12 depending on how the system is configured. The articles 20 which are discharged at the various sortation lanes 18 are subsequently loaded onto trucks or transported to other areas in the building where the system 10 is operating.

The article sortation system 10 of the present invention, is especially intended for sorting small to medium sized articles such as cartons, bags, books, apparel and the like. For example, the system 10 can sort articles which are relatively small dimensionally, such as cosmetics, and articles which are relatively large dimensionally, such as, cases of packaged articles, for example, books. The weight of such articles can typically range between only a few ounces and 30 pounds. Moreover, as will be explained, because of special features incorporated into the carrying trays 14, the system is also capable of handling round, rounded or irregularly shaped articles.

Figure 1B:
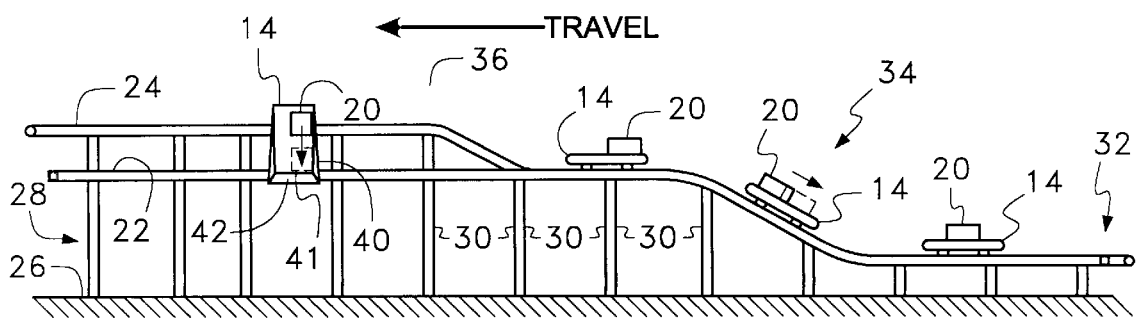
FIG. 1B is a side elevational view of the track assembly taken through line 1B—1B of FIG. 1A.
Figure 1C:
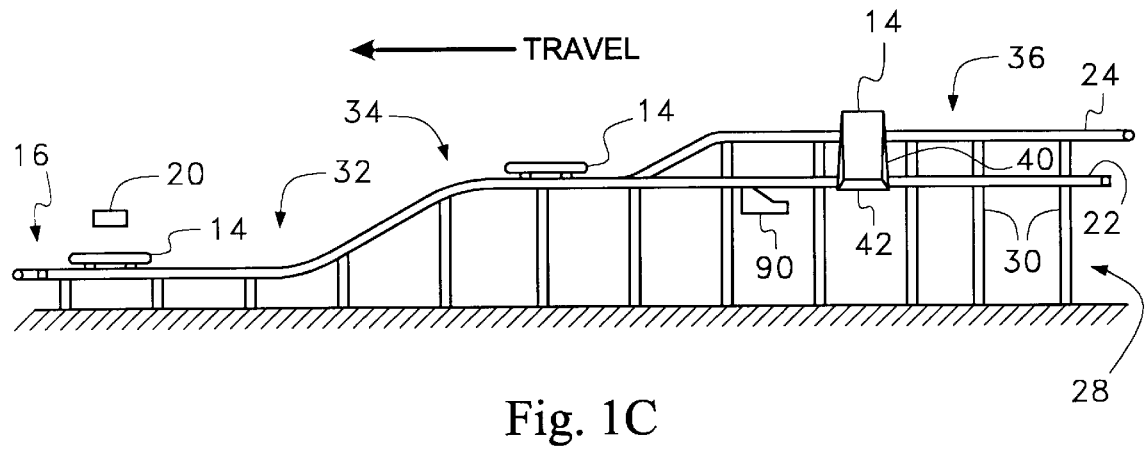
FIG. 1C is a side elevational view of the track assembly taken through line 1C—1C of FIG. 1A.

The track assembly 12 includes a drive track 22 and tray support rail 24, each of which are elevated above the ground or floor 26 at various heights along the route by a supporting framework 28 as shown in FIGS. 1B and 1C. As would be understood, the drive track 22 may be channel-shaped or be of another conventional design so as to include or support a drive chain other conveying mechanism. The supporting framework 28 is made up of a plurality of vertical stand supports 30. The length of each support 30 varies depending upon the desired elevation of each track at any given point along the route. The track assembly 12 is supported by the framework 28 at first, second, and third elevational orientations 32, 34, and 36. The first elevational orientation 32 is provided along the route at the article loading stations 16 as shown in FIG. 1B. In the first elevational orientation 32, the framework 28 supports the drive track 22 and the tray support rail 24 at the same vertical height to maintain the carrying trays 14 in a horizontal position for article loading. The second elevational orientation 34 is provided some distance downstream from the article loading stations 16. In the second elevational orientation 34 the framework 28 sharply increases the elevation of both the drive track 22 and the tray support rail 24 over a short linear span in order to momentarily tilt the leading end of the trays 14 upward thereby gently shifting a transported article toward the trailing end of the tray, preferably against the tray's trailing side wall 40. Moving slightly further down the route track assembly 12 is configured in the third elevational orientation 36, where the framework 28 preferably increases the elevation of the tray support rail 24 only, while maintaining the elevation of the drive track 22. The third elevational orientation 36 laterally tilts the trays 14 at an angle prior to reaching selected sortation lane 18. The lateral tilting of each carrying tray 14 gently shifts the transported article 20 toward and preferably against a discharge door of the tray 14 for discharge on the drive track 22 side of the track assembly 12. With the article 20 now positioned in a bottom corner 41 of the tray 14, the article 20 can now be discharged from the tray 14 at a selected sortation lane or destination point with substantially less jarring and with greater accuracy than if the article 20 is discharged from the original point of loading as in prior art tilting tray designs. As would be understood, the angle of inclination for the tray while in the third elevational orientation will be sufficient to facilitate article movement out of the tray when the discharge door to the tray is opened. Although the present invention is described as including a drive track and a tray support rail, it would be understood to a person skilled in the art that other types of drive and support arrangements, including alternate drive mechanisms and tracks, having comparable functionality may also be utilized.

Figure 1D:
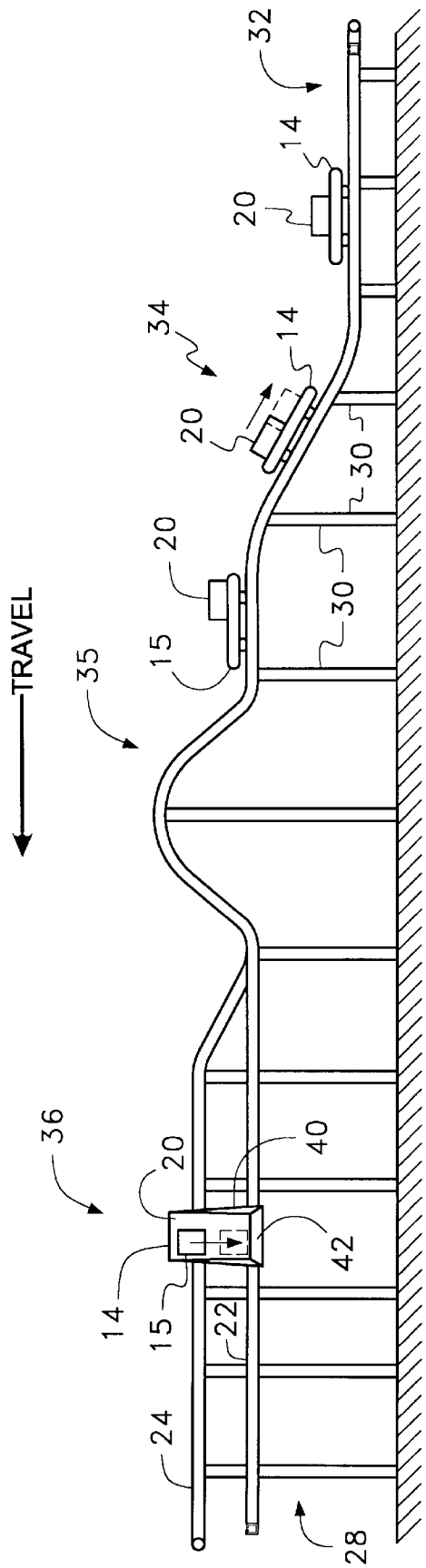
FIG. 1D is a side elevational view for an alternate embodiment of the track assembly.

Referring to FIG. 1D, an alternate embodiment of the present invention sortation system is shown where like reference numerals refer to like system components as described in previous figures. As shown in FIG. 1D, the sortation system includes a fourth elevational orientation 35 located between the second elevational orientation 34 and the third elevational orientation 36. The fourth elevational orientation 35 provides a sharp decrease in elevation of both the drive track and the tray support rail, for example, prior to reaching the third elevational orientation 36. The decrease in elevation provided by the fourth elevational orientation 35 momentarily tilts the leading end 15 of the trays 14 downward relative the trailing end of the trays. This produces a shift of the transported article toward the leading end of the tray, preferably against the tray's leading sidewalk. In this way, the lateral tilting of the tray which takes place at elevational orientation 36 will now gently shift the transported article 20 toward and preferably against the discharge door of the tray 14 at the leading end 15 of the tray 14.

With the article now positioned in the leading bottom corner of the tray 14, the article can now be discharged from the tray at a selected sortation lane or destination point utilizing the gravitational forces which act upon the article while the tray is in a laterally inclined orientation. It will be noted that the positioning of the article 20 at the leading bottom corner of the tray 14 is advantageous in that the article can be more accurately diverted from the tray. This is the case as positioning of the article at the leading bottom edge of the tray substantially prevents rotation of the article as it leaves the tray since the article 20 will avoid contact, for example, with any of the tray edges (which could produce a rotation or other type of article deflection) as the article is discharged. Also, although FIG. 1D shows elevational orientation 35 as including both an elevational increase and decrease or hump-like feature, it would be understood that a single elevational increase (for the leading end of the tray) may be incorporated at elevational orientation 34, wherein the fourth elevational orientation would include only an elevational decrease. It would also be understood that flexibility exists for selecting the actual location for elevational orientations 34 and 35 along the system route, as long as these orientations are implemented between elevational orientations 34 and 36. It may, however, be preferable for elevational orientation 35 to be located proximate elevational orientation 36 such that positioning of the article will remain intact.

Figure 4:
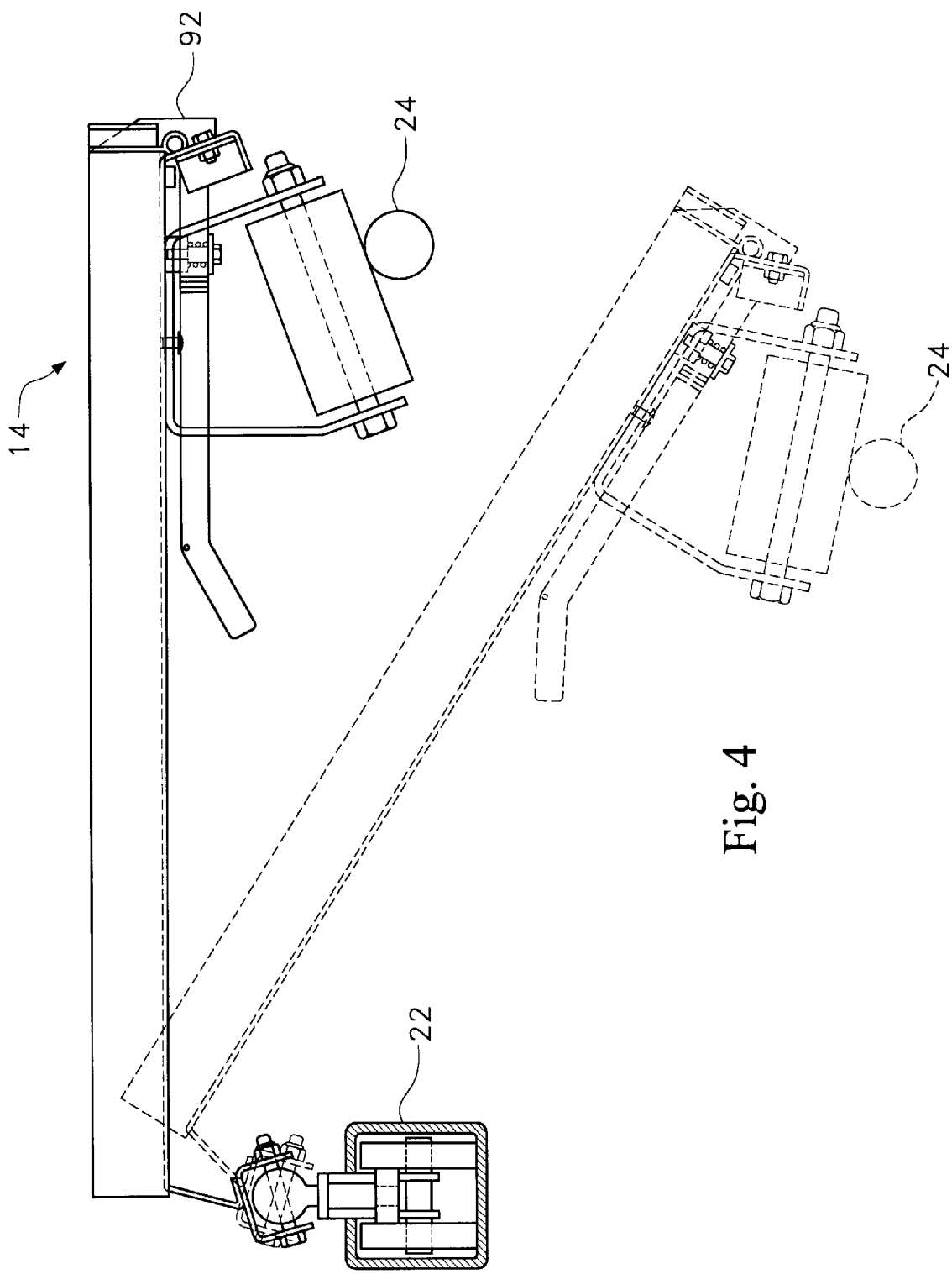
FIG. 4 depicts an alternative embodiment of the track assembly where the elevation of the tray support rail is decreased relative to the elevation of the drive track to facilitate article movement toward the bottom corner of a carrying tray.
Figure 5A:
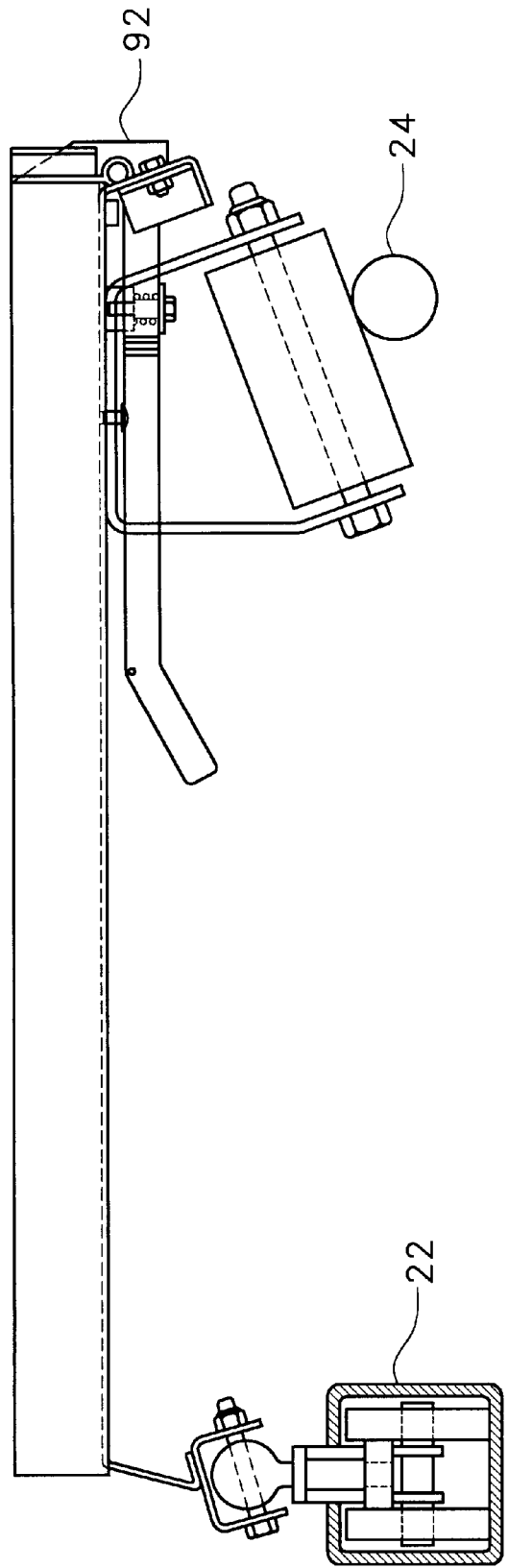
FIGS. 5A and 5B depict an alternative embodiment of the carrying tray.
Figure 5B:
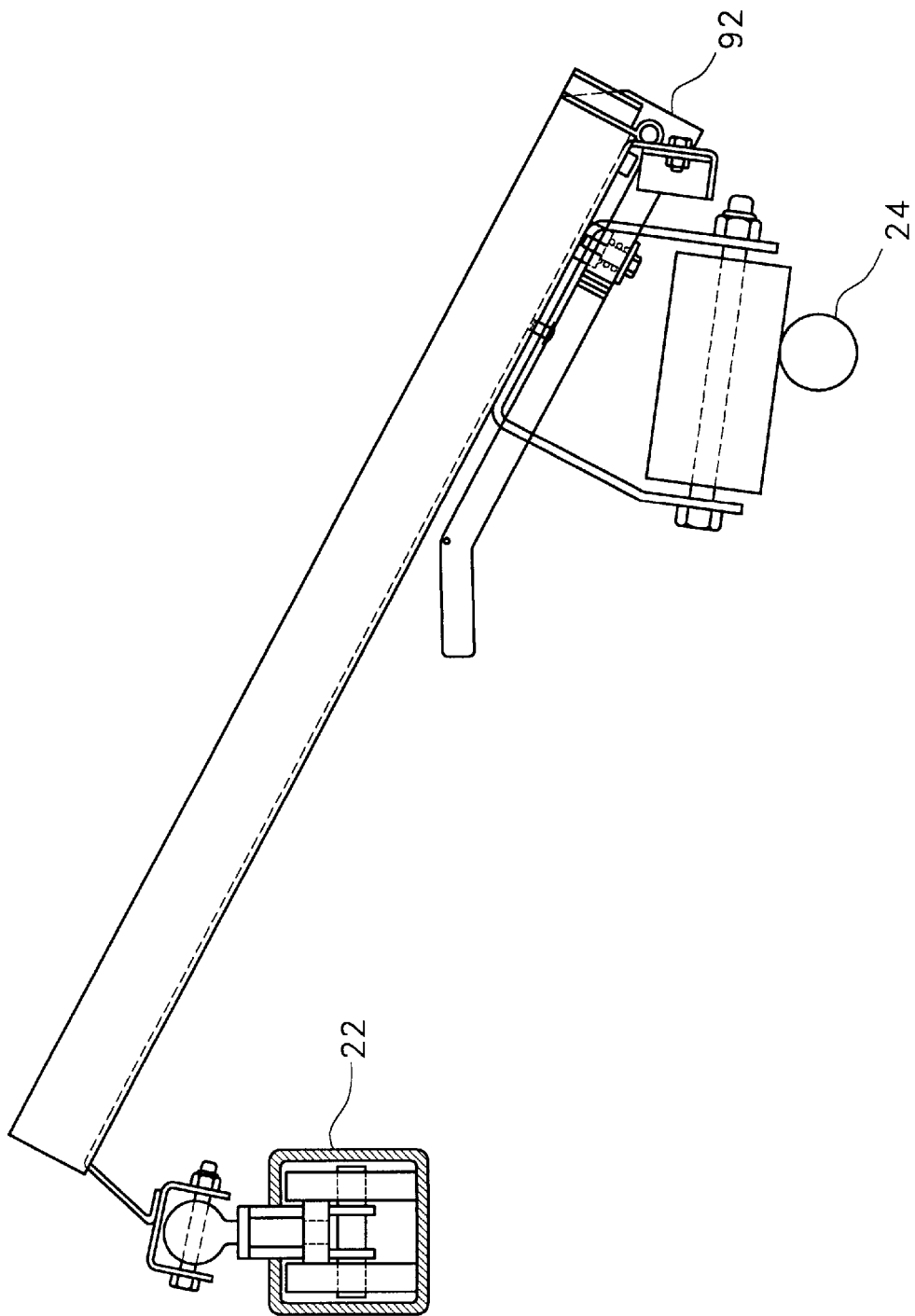

In other embodiments of the present invention, the track assembly 12 can include one or more areas where the framework 28 is configured to increase the elevation of the drive track 22 while maintaining the elevation of the tray support rail 24 in order to enable the trays 14 to be unloaded from the support rail side of the track assembly 12. In some embodiments of the invention, the third elevational orientation 36 can be achieved by decreasing the elevation of the drive track 22 relative to the tray support rail 24 or by decreasing the elevation of the tray support rail 24 relative to the drive track 22. For example, FIGS. 4, 5A and 5B show an embodiment where the elevation of the tray support rail 24 is decreased relative to the elevation of the drive track 22 to facilitate article movement toward the bottom corner 41 of the tray 14.

As shown in FIG. 1C, once a carrying tray 14 discharges its article 20, the carrying tray 14 continues further along the route to an area of the track assembly 12 configured in the second elevational orientation 34 which places the tray 14 back into the horizontal position. Moving further along, the carrying tray 14 returns to the first elevational orientation 32 of the track assembly 12 and the loading stations 16.

Referring again to FIG. 1A, the track assembly 12 also includes a variable speed electric motor 44 for powering a drive chain 45 or other conveying means which runs through the drive track 22 to drive and brake the carrying trays 14 which are attached to the drive chain. In a preferred embodiment of the invention the drive track may move the carrying trays at speeds ranging between 5 ft./min. to 160 ft./min. A control diverter 46 is located between the drive track 22 and the tray support rail 24, in areas of the track 12 assembly that come just before a sortation lane 18 in the travel direction of the trays 14. Each control diverter 46 is used to selectively trigger a latch mechanism of a tray 14 when the tray 14 reaches a selected sortation lane 18, to open the discharge door 42 of the tray 14 to allow the article 20 carried therein to gently slide from the tray 14 into a chute or a shipping carton at the selected sortation lane 18 or destination point after discharge of the article. The discharge door 42 is automatically closed by means of a cam block 90. As can be seen in FIG. 1C, the cam block 90 is generally wedge-shaped such that the discharge door contacts the block at an angled portion thereof. As the movement of the tray continues toward the cam block, the angled portion of the block gradually closes the discharge door of the tray.

A programmable logic controller 50 (PLC) is used for routing the articles 20 to their desired sortation lanes 18. The PLC 50 uses the speed of the drive chain, the identity of the carried article 20, and the location of the trays 14 at predetermined points along the track assembly 12 to route the articles 20 to their desired sortation lanes 18. The programmable logic controller 50 (PLC) is also provided as an interface between a microprocessor based main controller 48, for example a personal computer, and the motor 44, the diverters 46 and various other pieces of peripheral hardware which are used to identify and route the carried articles 20. PLCs are general purpose combinational or sequential digital components whose ultimate function is determined by the designer. The PLC of the present invention essentially functions as a plurality of programmable "switches" which can be programmed, erased and reprogrammed to implement the functions of the various peripheral hardware items which are connected to the PLC. The timing and selection of these switches are determined by the controller 48.

The various other pieces of hardware mentioned above include means for identifying the article 20 so that the controller 48, for example a PC, can determine to which sortation lane 18 the article 20 is to be diverted. The article identification means can take the form of an operator keyboard 52 for manual entry of article information and/or a hand-held, wand-style identification-code scanner 54, and/or an identification-code scanner 56 permanently attached to the track assembly 12 for automatic entry of article 20 information. A photosensor 57 is also included at a fixed location along the track assembly 12 for the purpose of determining whether a tray 14 in the sortation system is loaded with an article 20. The fixed location scanner and/or photosensor provides a defined reference point for the specific location of a tray or article within the system. An encoder 58 associated with the drive motor 44, monitors the speed of the motor 44 in pulses/RPM (revolutions/minute), for example, and converts that signal into a digital signal which represents a linear dimension. This digital signal is transmitted to the PLC to enable the PLC 50 to determine the location of each tray 14 on the track assembly 12 based upon a previously determined reference location. The exact discharge instructions and location for a specific tray can then be realized, for example, by decrementing a counter corresponding to the specific tray as the trays pass by either the photosensor or scanner. Since, in a preferred embodiment, there are set number of equally spaced trays included in the system, a specific count of encoder pulses which corresponds to a specific tray will indicate a discharge location as would be understood by a person skilled in the art.

Figure 2:
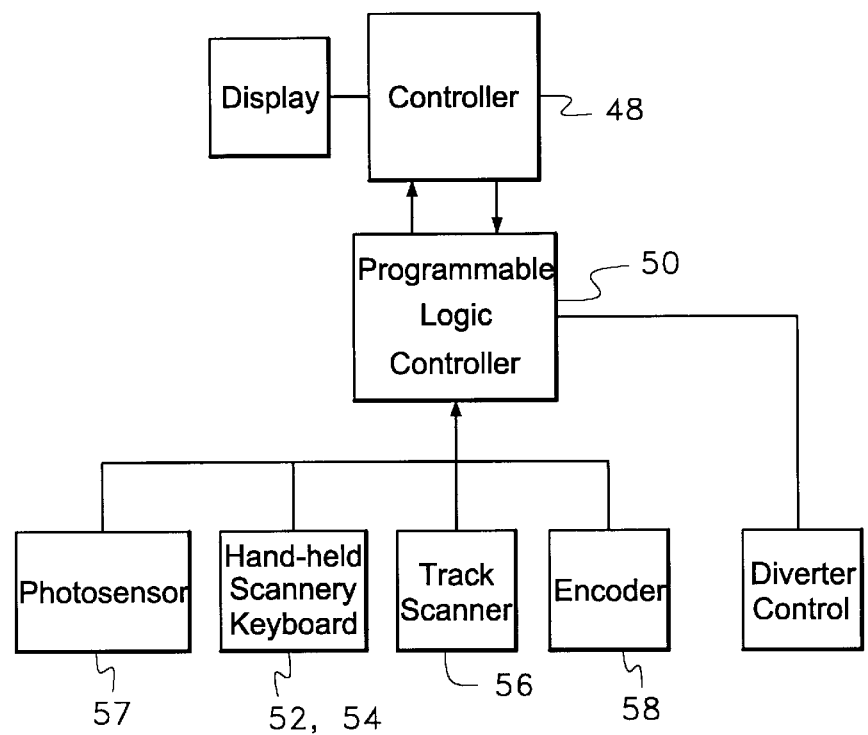
FIG. 2 is flowchart depicting the message architecture used in the article sortation system of the present invention.

The block diagram of FIG. 2, depicts the message flow for the system architecture used in the present invention. The information generated by the keyboard/identification-code scanners 52, 54, 56 are transmitted to the main controller 48 via the PLC 50. As discussed, the controller 48 is programmed to use this information to determine to which sortation lane 18 an article 20 is to be diverted. The PLC 50 activates the appropriate control diverter 46 associated with the selected sortation lane 18 at an appropriate interval based on location of a tray. The controller also includes software which enables an operator to change a store assignment for any sortation lane 18 at any time. Such changes take effect when the next article is scanned. The software also allows the controller 48 to provide current and historical information for each article identification-code that was processed, sortation statistics and activity logging that can be viewed on an on-line screen.

The controller software also provides a security system that controls access to the system 10 using security profiles. The security system is configured so that all users have full access to each area of the system 10. As would be understood, the security system also enables administrators to limit user access to specific system functions.

The administrator of the system 10 assigns each user an ID which allows them access to the system 10. A user ID can be unique to an individual or can be used to represent a group of users. Each user ID has an associated password thus preventing unauthorized use of the ID.

Each user ID is attached to a security profile. The administrator of the system 10 creates various security profiles which define the functionality of the system 10 that can be accessed. This allows multiple users to be given the same security clearance simply by assigning their user IDs to the same profile.

The security system also maintains an audit trail that tracks what parts of the system each user ID has accessed and when it was accessed. Accordingly, this feature enables individuals to be accountable for their actions.

The security system provides three security screens, a Log In screen which allows a user to access the security system; a User Maintenance screen which allows authorized users to add or delete a user ID as well as change security information associated with it; and a Profile Maintenance screen which allows authorized users to add or delete security profiles or to restrict or grant permission of system functions to a specified profile.

The controller software also provides a number of system screen layouts. The first of these screens is a main menu screen which allows an operator to select any of the available other screens for setting parameters, monitoring and changing certain parameter values in the PLC. From the main menu screen, the operator can choose any option from the menu bar or any submenu that is not currently unavailable or grayed out. The operator may reset the sorter counts and statistics by selecting a "Reset PLC Statistics" option under "System." This action will reset all the product counts, reads, etc. for each lane in the Sortation system.

Figure 7:
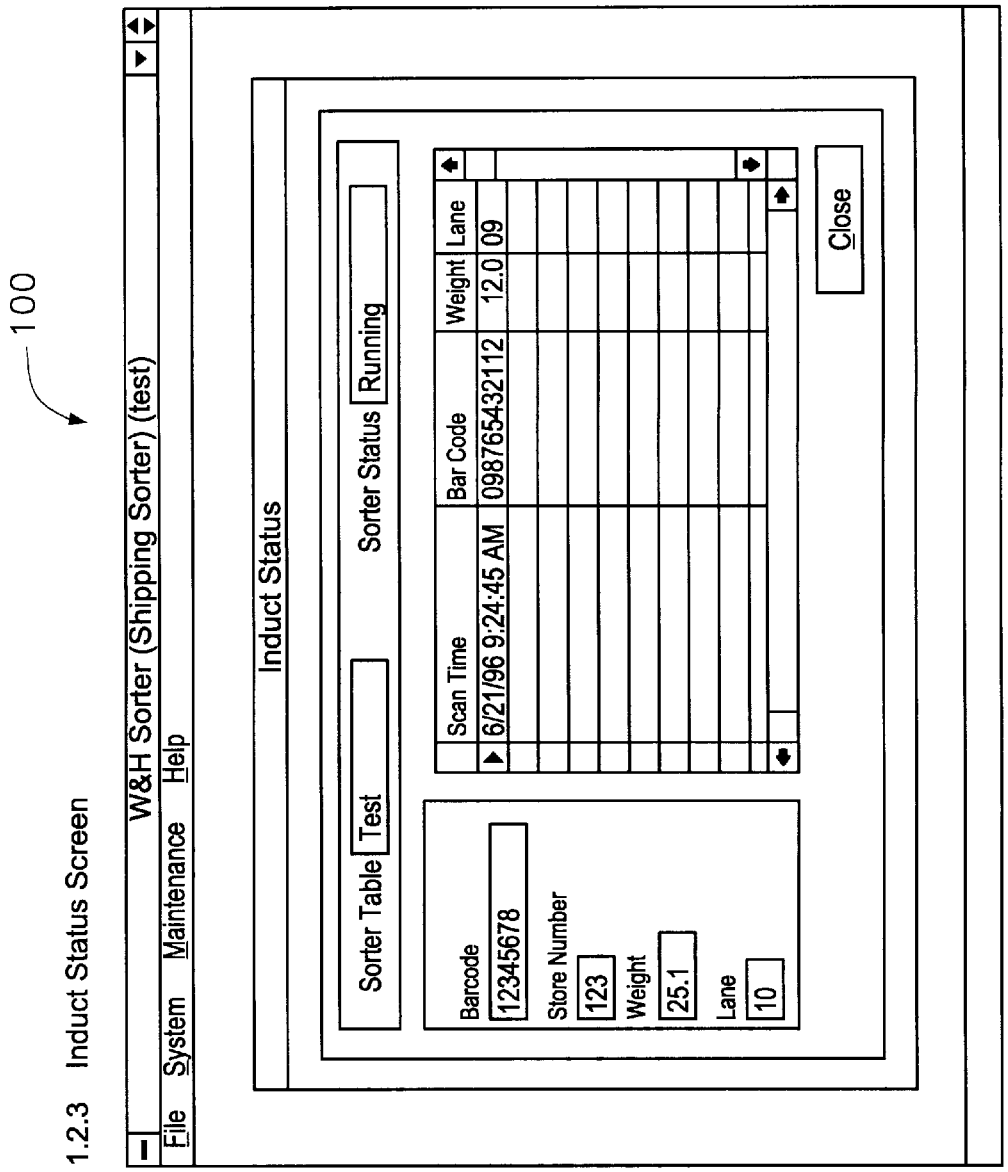
FIGS. 7, 8 and 9 depict exemplary embodiments of display screens generated in connection with software modules found in a controller of the present invention.

Referring to FIG. 7, an exemplary embodiment of an induct status screen 100 is shown for displaying induct activity as it occurs at the sortation scanner. In the shown illustration, for example, as an identification code is scanned, a field's bar-code and lane number are updated. These fields display the scanned identification code of the article 20 and the lane number for which the article 20 is destined, based on a current sorter table. A listing of the last 100 identification codes scanned can be maintained to provide a history of articles scanned.

A lane statistics screen is also provided for summarizing the status of each sortation lane. This includes the lane number, the number of articles diverted, the number of full line occurrences, the total duration of full line condition and the number of jams.

A sorter error log screen is provided for displaying sorter errors in reverse chronological order. This screen includes a date and time stamp of the error and the error message.

The sorter article history is provided on a sorter article history screen which displays identification codes, scanned time, article handle and sortation lane assigned in chronological order for all articles that have been scanned and not purged.

Figure 8:
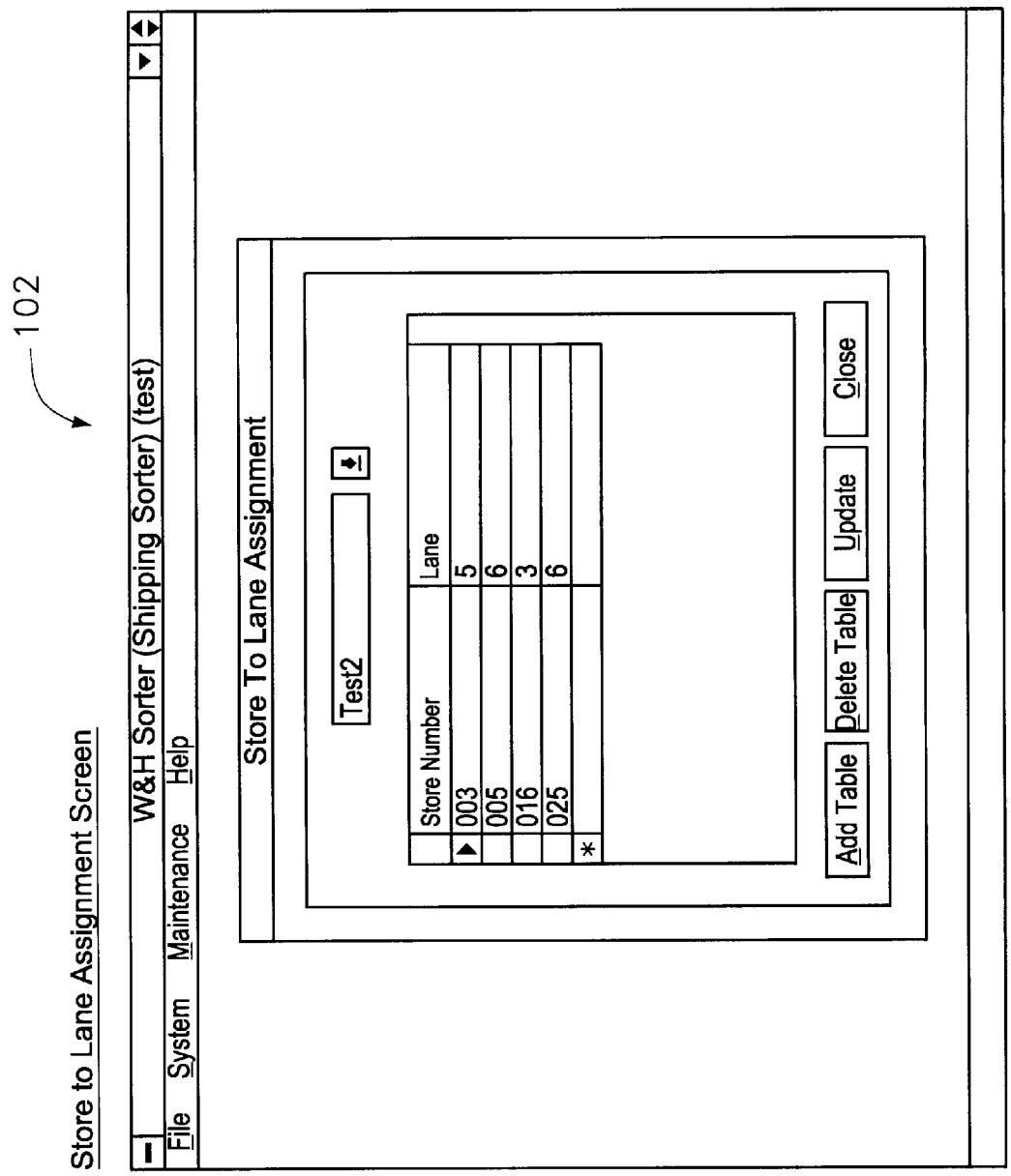

A sortation parameters screen 102 is shown in FIG. 8 and is provided for allowing operators to configure various system parameters. An operator can set the number of consecutive times a condition occurs that causes the system 10 to shut down. An operator can also set purge frequencies for the error log and article history along with the system date and time.

Tables that will associate a store number on the article 20 identification code to the lane to which the product should be diverted can be created and maintained with a store to sortation lane assignment screen which is provided.

Figure 9:
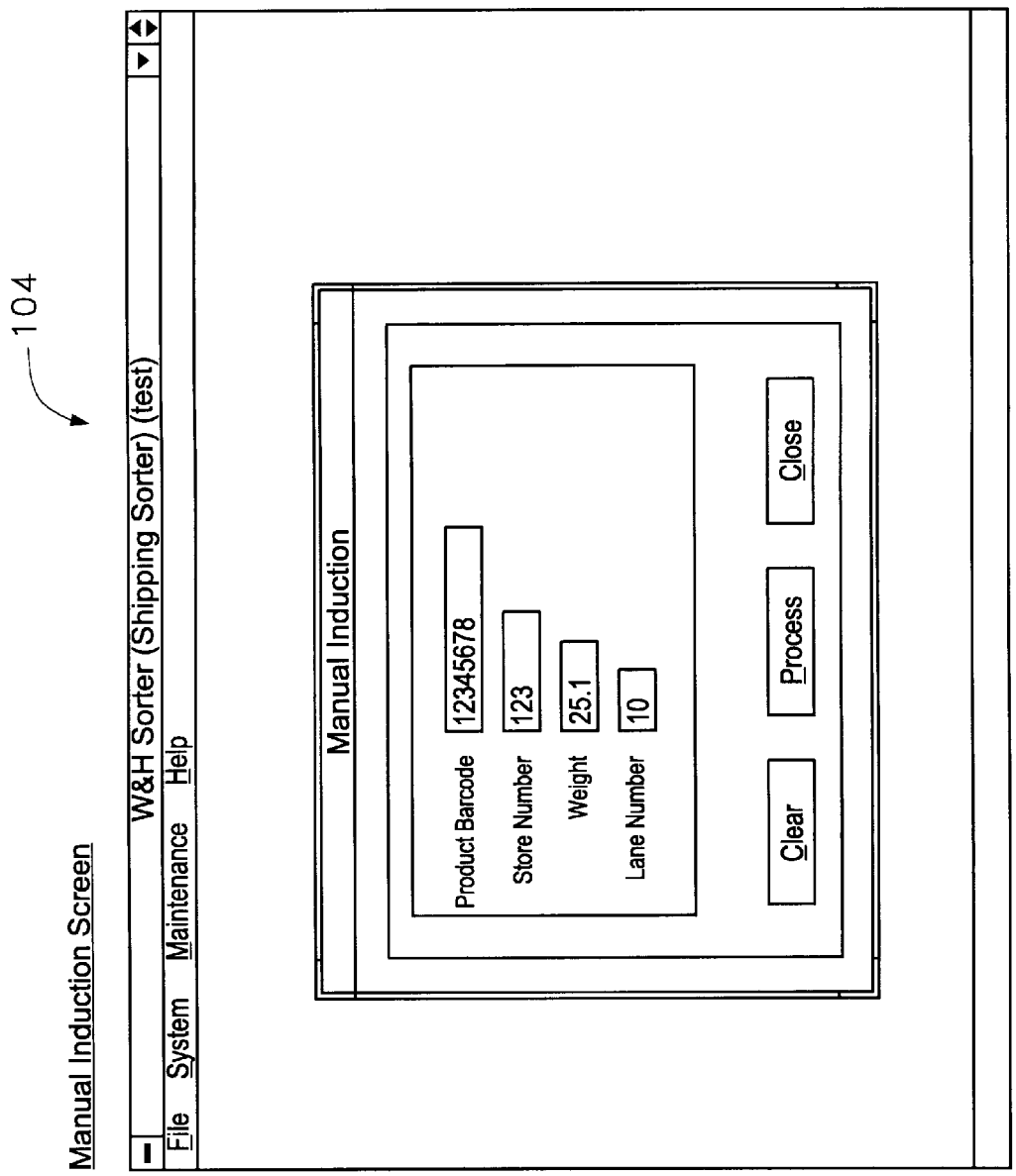

An additional screen, shown in FIG. 9 is a manual induction screen 104 which is used to enter articles manually, such as non-conveyables and articles that are not readable at the identification code scanners. Based on the exemplary illustrations and descriptions of the various screens included in the software of the controller, it is anticipated that a person skilled in the art could realize suitable implementations of the screens which have been discussed.

Figure 3A:
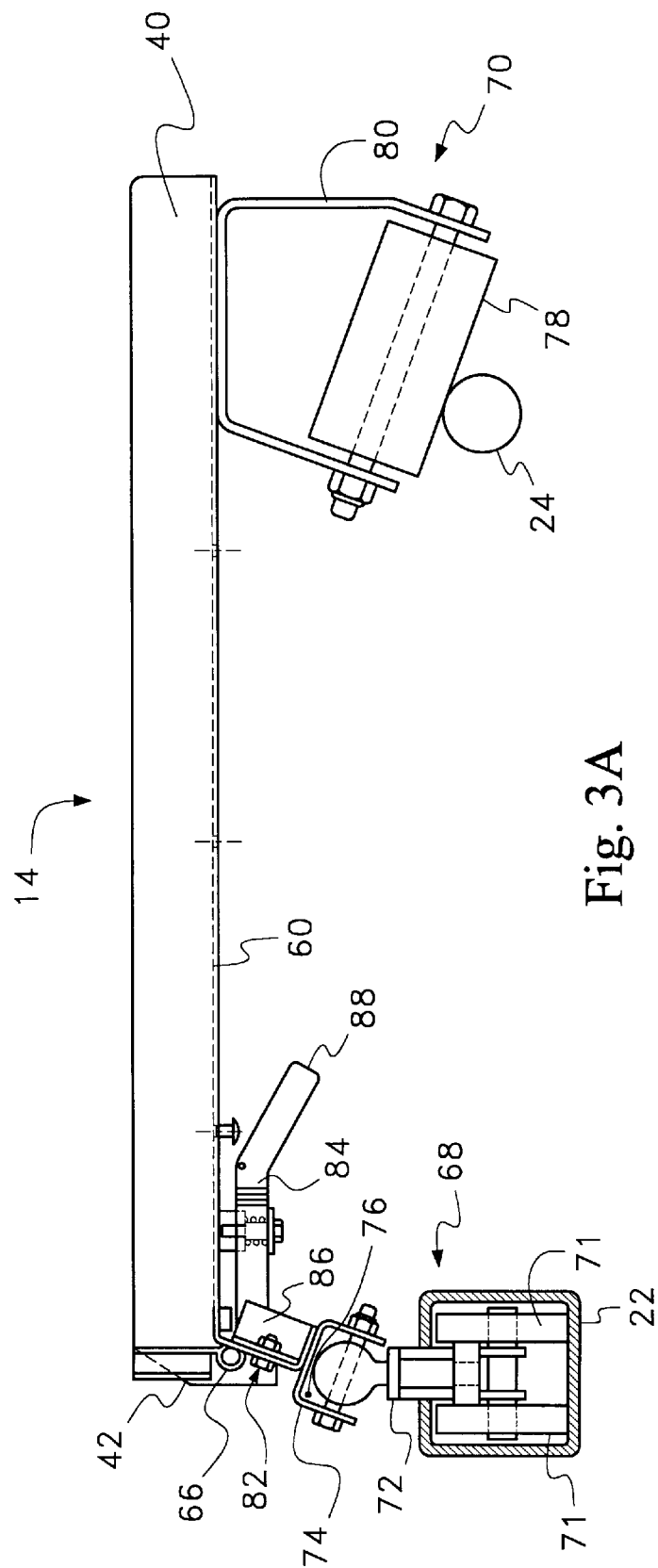
FIG. 3A is a cross-sectional view of the track assembly taken through line 3A—3A of FIG. 1A and depicts an exemplary embodiment of a carrying tray in a horizontal position.
Figure 3B:
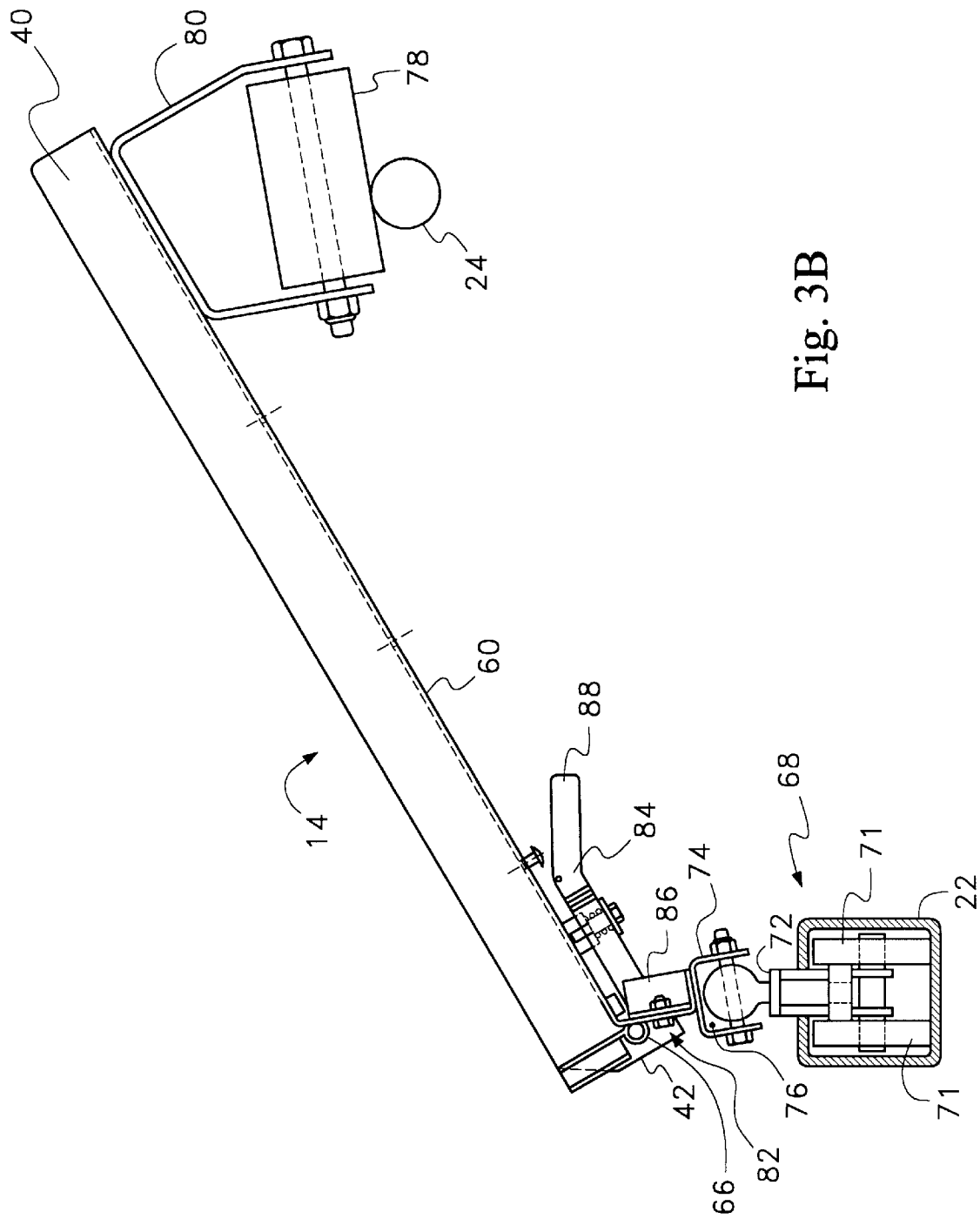
FIG. 3B is a cross-sectional view of the track assembly taken through line 3B—3B of FIG. 1A and depicts the carrying tray of FIG. 3A in a laterally tilted position.
Figure 3C:
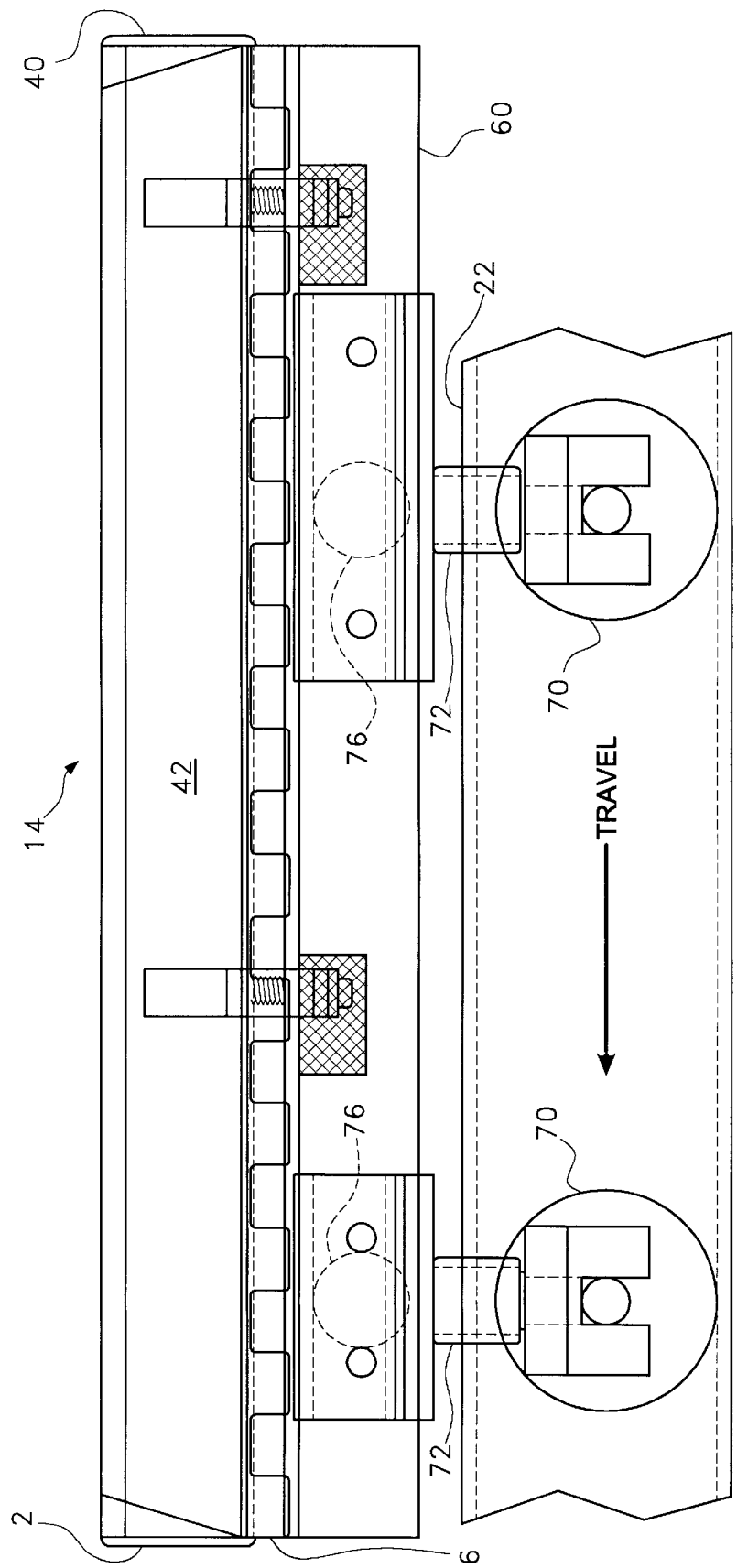
FIG. 3C is a side elevational view of the carrying tray of FIGS. 3A and 3B.
Figure 3D:
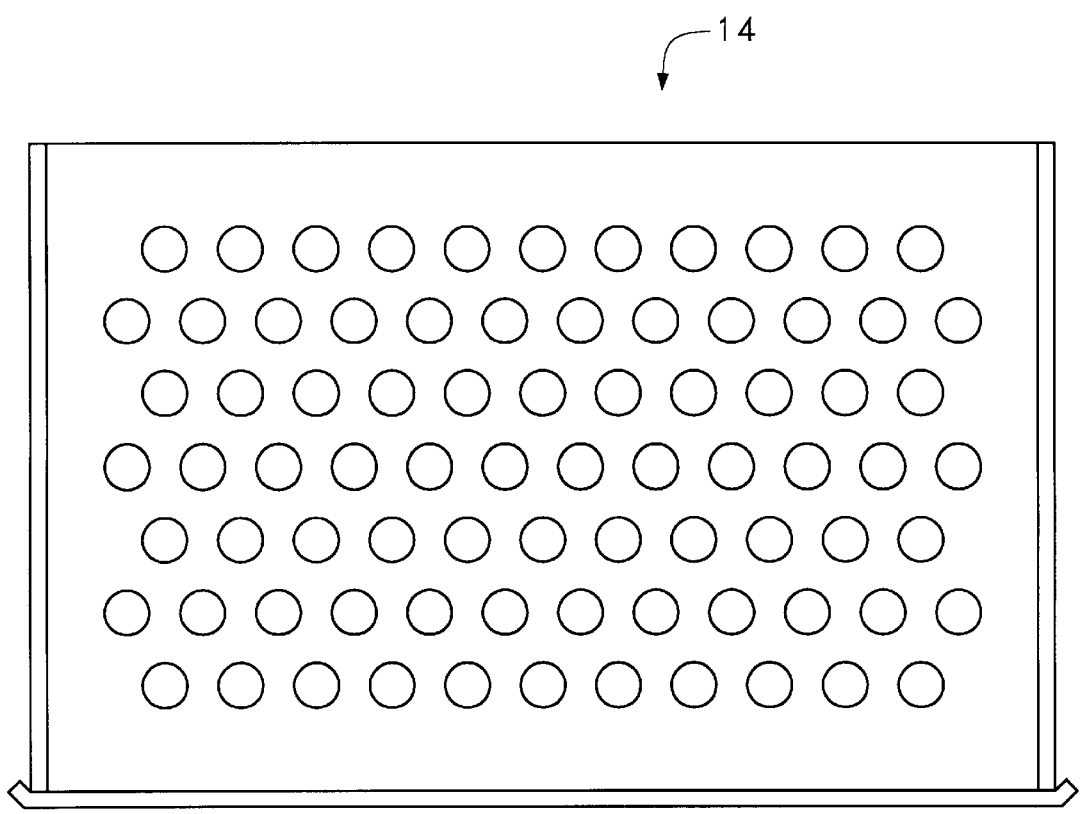
FIG. 3D is a top plan view of the carrying tray of FIGS. 3A–3C.
Figure 3E:
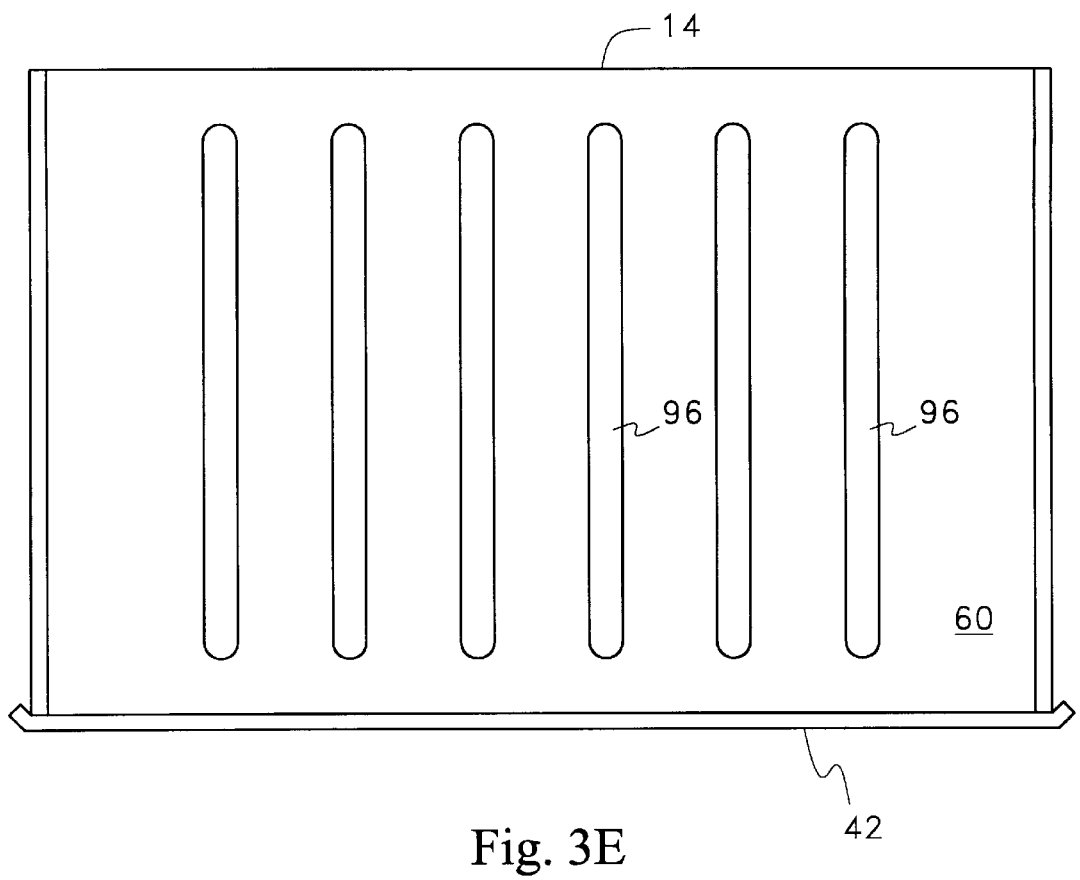
FIG. 3E is a top plan view of an alternate embodiment of the carrying tray.

Referring collectively now to FIGS. 3A–3D, each carrying tray 14 comprises a base 60 with a leading sidewall 62 and the earlier described trailing sidewall 40. The base 60 of the carrying tray 14 includes a plurality of apertures 64 which enables the track-mounted photosensor because of customary resolution parameters to easily determine that a non-loaded tray is empty and in the alternative to view the presence of an article and/or identification code of an article 20 loaded in the tray 14. As shown in FIG. 3E, an alternate embodiment of the carrying tray may also include raised rib features 96 in the base 60 thereof so as to accommodate the handling of, for example, round objects. In this case, the round objects are stabilized in between the rib features and are prevented from substantial movement within the tray. It would be understood, that any suitable pattern of rib features may be used within the carrying trays and that that aperture feature may or may not also be included.

The carrying trays 14 are generally sized to accommodate the largest article 20 to be sorted. In one embodiment, the carrying tray 14 is approximately 1 to 3 feet in length and approximately 1.5 feet in width. The discharge door 42 described earlier, extends between the leading sidewall 62 and the trailing sidewall 40, and is attached to the base 60 by a spring-loaded hinge arrangement 66 including a discharge lever 84. Each carrying tray 14 also includes a roller assembly 68, 70 at each corner of the carrying tray 14, respectively. The roller assemblies 68 traveling in the channel-shaped drive track 22 each comprise a pair of wheels 71 coupled to a ball hitch 72. The ball hitch 72 allows the carrying trays 14 to negotiate curves in the track assembly 12. The ball hitch 72 of each roller assembly 68 is coupled to a linear bearing 76 which is mechanically attached to the base 60 of the carrying tray 14. This enables the carrying tray 14 to tilt with respect to the roller assemblies 68. The ball hitch 72 of each roller assembly 68, is coupled to a bracket 74 via the linear bearing 76 to provide fore and aft movement of the tray assembly 40 relative to the ball hitch 72. This arrangement facilitates the travel of the carrying trays 14 over the inclined and ascending portions of the track assembly 12. The ball hitch 72 of each drive track 22 roller assembly 68 is also coupled to the drive chain which travels in the drive track 22 to drive and brake the carrying trays 14. The roller assemblies 70 traveling on the tray support rail 24 each comprise a cylindrical-shaped wheel 78 which is coupled to a slightly skewed, U-shaped bracket 80 affixed to the base 60 of the carrying tray 14. The configuration of the bracket 80 provides the wheel 78 with a positive camber angle which prevents lateral rocking of the carrying trays 14 when they travel in the horizontal orientation. When the track assembly 12 tilts the carrying trays 14, the bracket 80 provides the wheel 78 with a slight negative camber angle which laterally stabilizes the carrying trays 14 as they travel in the tilted orientation.

As briefly described above, each tray 14 is provided with a latch mechanism 82 which locks and unlocks the spring-loaded discharge door 42 of the tray 14. The latch mechanism 82 includes a pivotally mounted spring-loaded lever 84 having a latch end 86 and a free end 88. The latch end 86 of the lever 84 cooperates with a slot arrangement (not shown) on the discharge door 42 to lock the discharge door 42 in the closed position. When the lever 84 is pivoted, the latch end 86 of the lever 84 disengages the slot arrangement to unlock the door 42. Such latch arrangements are well known in the art.

Figure 6B:
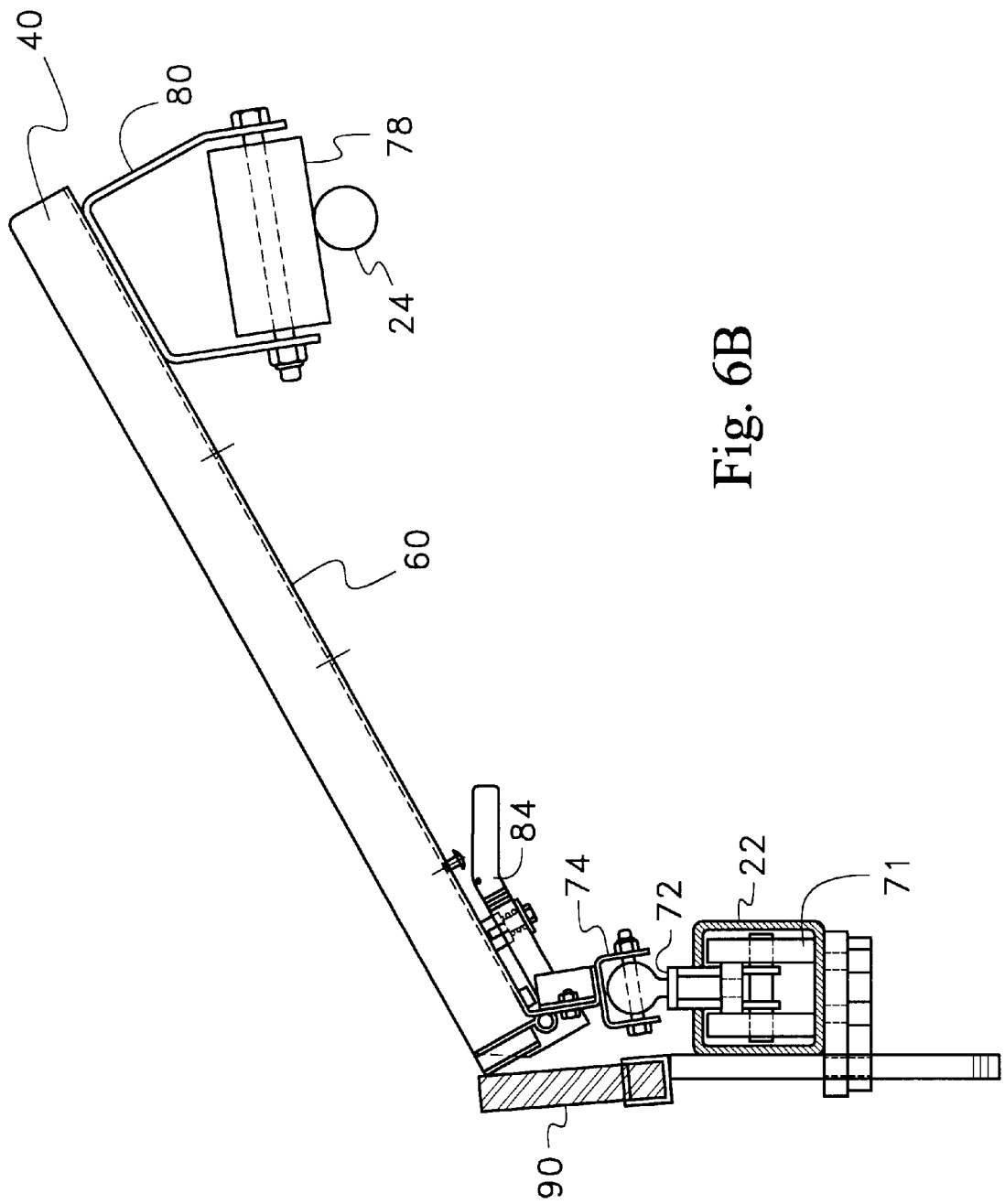
FIG. 6B depicts a cam block which closes the discharge door of the carrying trays.

As shown in FIG. 6A, the control diverter 46 is a well known solenoid actuator. When one of the control diverters 46 located along the track assembly 12 is selectively energized a portion of the diverter 46 engages the free end 88 of the carrying tray's 14 latch lever 84 and causes the lever 84 to pivot as shown. The pivotal movement of the lever 84 unlocks the discharge door 42 upon whose hinge 66 the door 42 immediately opens due to the forces of gravity. Soon after discharging the article 20 from the carrying tray 14, the still tilted carrying tray 14 passes a wedge-shaped cam block 90 located on the discharge door side of the track assembly 12, which engages the opened discharge door 42 and closes it as shown in FIG. 6B. As the discharge door closes, the latch end 86 of the spring-loaded lever 84 engages the slot arrangement of the latch of the door 42 to lock the door 42 closed.

FIGS. 5A and 5B illustrate an embodiment of the carrying tray 14 which has the discharge door 92 on the tray support rail 24 side of the carrying tray 14. In this embodiment, the elevation of the tray 14 support rail 24 drops to tilt the carrying tray 14.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A system for sorting articles, comprising:
    a track defining a route starting at at least one loading point, continuing onto a plurality of destination points, and arriving back at said at least one loading point;
    at least one tray for conveying an article from said at least one loading point to a selected one of said destination points, said at least one tray having a leading end and a trailing end;
    wherein said track includes first means for momentarily tilting said leading end of said at least one tray upward relative to said trailing end of said at least one tray, and second means for laterally tilting said at least one tray at an angle, said first and second means for selectively maneuvering an article loaded in said at least one tray to a bottom corner thereof prior to said at least one tray reaching said selected one of said destination points in order to substantially reduce the jarring of the article during the discharge thereof at said selected one of said destination points.

2. The system for sorting articles according to claim 1, further comprising third means for momentarily tilting said leading end of said at least one tray downward relative said trailing end of said at least one tray to maneuver said article toward said leading edge of said tray, said third means located between said first means and said second means.

3. The system for sorting articles according to claim 1, further comprising tray driving means for driving said at least one tray along said track.

4. The system for sorting articles according to claim 1, wherein said at least one tray includes means for enabling the article to be selectively discharged from said at least one tray when said at least one tray reaches said selected one of said destination points.

5. The system for sorting articles according to claim 1, further comprising diverter means for causing the article to be discharged from said at least one tray at said selected one of said destination points.

6. The system for sorting articles according to claim 5, further comprising controller means coupled to said diverter means for selectively activating said diverter means.

7. The system for sorting articles according to claim 1, further comprising controller means for determining said selected one of said destination points using information relating to the location of said at least one tray on said track and the article loaded thereon.

8. The system for sorting articles according to claim 7, further comprising:
    tray driving means for driving said at least one tray along said track,
    speed measuring means coupled between said controller means and said tray driving means, for monitoring the speed of said tray driving means, said controller means using the speed of said tray driving means and a sensed reference location of said tray to determine the location of said at least one tray on said track.

9. The system for sorting articles according to claim 7, further comprising scanning means coupled to said controller means, for scanning an identification-code disposed on the article loaded on said at least one tray and a photosensor means for sensing presence of the article on said at at least one tray.

10. The system for sorting articles according to claim 9, further comprising diverter means coupled to said controller means and associated with said destination points of said track, for causing the article to be discharged from said at least one tray at said selected one of said destination points, said controller activating said diverter means in response to information received from said speed measuring means and said scanning means.

11. The system for sorting articles according to claim 9, wherein said photosensor means is associated with said track such that said at least one tray passes over said photosensor means as said at least one tray moves along said track, said at least one tray including a base with a plurality of apertures which enables said photosensor means to scan through said base and determine whether said at least one tray includes said article.

12. The system for sorting articles according to claim 1, wherein said at least one tray includes raised rib sections in a base portion thereof to provide stabilization in said tray for specific article types.

13. The system for sorting articles according to claim 12, wherein said specific article types include round objects.

14. A system for sorting articles, comprising:
    a track defining a route starting at at least one loading point, continuing on to a plurality of destination points, and arriving back at said at least one loading point;
    at least one tray for conveying an article from said at least one loading point to a selected one of said destination points, said at least one tray having a leading end and a trailing end;
    wherein said track includes at least a first segment for orienting said at least one tray in a horizontal position in order that said at least one tray can be loaded with an article at said at least one loading point, at least a second segment for momentarily tilting said leading end of said at least one tray upward relative to said trailing end of said at least one tray, and at least a third segment for laterally tilting said at least one tray at an angle from said horizontal position, said second and third segments of said track selectively maneuvering the article loaded in said at least one tray to a bottom corner thereof prior to said at least one tray reaching said selected one of said destination points in order to substantially reduce the jarring of the article during the discharge thereof at said selected one of said destination points.

15. The system for sorting articles according to claim 14, further comprising a fourth segment for momentarily tilting said leading end of said at least one tray downward relative to said trailing end of said at least one tray to maneuver said article toward said leading edge of said tray prior to reaching said third segment, said fourth segment coupled between said second segment and said third segment.

16. The system for sorting articles according to claim 14, further comprising:
    a drive chain coupled to said at least one tray for pulling said at least one tray along said track; and
    an electric motor for driving said drive chain.

17. The system for sorting articles according to claim 14, wherein said at least one tray includes a discharge door and latch means for opening said discharge door to discharge the article when said at least one tray reaches said selected one of said destination points.

18. The system for sorting articles according to claim 17, further comprising a diverter associated with each of said destination points, one of said diverters being operative for activating said latch means to discharge the article from said at least one tray at said selected one of said destination points.

19. The system for sorting articles according to claim 18, further comprising controller means coupled to said diverters for selectively activating said one of said diverters.

20. The system for sorting articles according to claim 14, further comprising controller means for determining said selected one of said destination points using information pertaining to the location of said at least one tray on said track and the article loaded thereon.

21. The system for sorting articles according to claim 20, further comprising:
   a motor; and
   an encoder coupled to said controller means and said motor for monitoring the speed of said motor in revolutions/minute and converting the speed into a digital signal representing a linear dimension, said controller means using said digital signal representing said linear dimension and a sensed reference location of said tray to determine the location of said at least one tray on said track.

22. The system for sorting articles according to claim 20, further comprising a scanning means coupled to said controller means, for scanning an identification code disposed on an article loaded on said at least one tray and a photosensor means for sensing presence of the article on said at least one tray and a photosensor means for sensing presence of the article on said at least one tray.

23. The system for sorting articles according to claim 22, further comprising a plurality of diverters coupled to said controller means, each one of said diverters associated with one of said destination points, one of said diverters being operative for causing the article to be discharged from said at least one tray at said selected one of said destination points, said controller selectively activating one of said diverters in response to information received from said encoder and said scanning means.

24. The system for sorting articles according to claim 22, wherein said photosensor means is associated with said track such that said at least one tray passes over said photosensor means as said at least one tray moves along said track, said at least one tray including a base with a plurality of apertures which enables said photosensor means to scan through said base and determines whether said at at least one tray includes said article.

25. The system for sorting articles according to claim 22, wherein said controller means provides an operator of said system with a plurality of graphical user interface screens.

26. The system for sorting articles according to claim 14, wherein said at least one tray includes raised rib sections in a base portion thereof to provide stabilization for articles loaded in said tray.

27. A system for sorting articles, comprising:
   a track defining a route starting at at least one loading point, continuing on to a plurality of destination points, and arriving back at said at least one loading point;
   at least one tray for conveying an article having an identification code disposed thereon, from said at least one loading point to a selected one of said destination points;
   photosensor means for determining whether said article is disposed within said at least one tray;
   scanning means for scanning the identification-code disposed on the article loaded in said at least one tray; and
   controller means for determining said selected one of said destination points using the identification-code disposed on the article, wherein said track includes first means for momentarily tilting a leading end of said at least one tray upward relative to a trailing end of said at least one tray, and second means for laterally tilting said at least one tray at an angle, said first and second means selectively maneuvering an article loaded in said at least one tray to a bottom corner thereof prior to said at least one tray reaching said selected one of said destination points in order to substantially reduce the jarring of the article during the discharge thereof at said selected one of said destination points.

28. The system for sorting articles according to claim 27, further comprising:
   a motor; and
   an encoder coupled to said controller means and said motor for monitoring the speed of said motor in revolutions/minute and converting the speed into a digital signal representing a linear dimension, said controller means using said digital signal representing said linear dimension to determine the location of said at least one tray on said track.

29. The system for sorting articles according to claim 27, further comprising third means for momentarily tilting said leading end of said at least one tray downward relative said trailing end of said at least one tray to maneuver said article toward said leading edge of said tray, said third means located between said first means and said second means.

* * * * *